United States Patent
Kido et al.

(10) Patent No.: US 8,379,140 B2
(45) Date of Patent: Feb. 19, 2013

(54) VIDEO IMAGE PICKUP APPARATUS AND EXPOSURE GUIDE DISPLAY METHOD

(75) Inventors: Takeshi Kido, Kanagawa-ken (JP);
Toshihide Kobayashi, Tokyo-to (JP);
Kazunori Shioda, Kanagawa-ken (JP)

(73) Assignee: JVC Kenwood Corporation, Yokohoma (JP)

( * ) Notice: Subject to any disclaimer, the term of this patent is extended or adjusted under 35 U.S.C. 154(b) by 769 days.

(21) Appl. No.: 12/461,690

(22) Filed: Aug. 20, 2009

(65) Prior Publication Data

US 2010/0045824 A1    Feb. 25, 2010

(30) Foreign Application Priority Data

Aug. 21, 2008    (JP) ................ P2008-213152

(51) Int. Cl.
*H04N 5/238* (2006.01)
*H04N 5/222* (2006.01)

(52) U.S. Cl. .......... 348/364; 348/222.1; 348/234; 348/333.02

(58) Field of Classification Search .............. None
See application file for complete search history.

(56) References Cited

U.S. PATENT DOCUMENTS

| | | | | |
|---|---|---|---|---|
| 5,883,666 A | * | 3/1999 | Kyuma et al. | 348/229.1 |
| 7,286,167 B2 | * | 10/2007 | Sakamoto et al. | 348/231.6 |
| 8,035,728 B2 | * | 10/2011 | Subbotin et al. | 348/364 |
| 8,115,836 B2 | * | 2/2012 | Miyahara et al. | 348/254 |
| 8,139,079 B2 | * | 3/2012 | Ueyama | 345/590 |
| 8,144,214 B2 | * | 3/2012 | Yamashita et al. | 348/229.1 |

FOREIGN PATENT DOCUMENTS

| | | |
|---|---|---|
| JP | 07-038801 A | 2/1995 |
| JP | 2003-125240 A | 4/2003 |
| JP | 2006-295814 A | 10/2006 |

* cited by examiner

*Primary Examiner* — Ngoc-Yen Vu
(74) *Attorney, Agent, or Firm* — Nath Goldberg & Meyer; Jerald L. Meyer; Stanley N. Protigal

(57) ABSTRACT

A video image pickup apparatus (10) includes an image sensor (120), a knee processor (132) for performing a compression in a high-luminance characteristic interval of a picture signal based on an output signal of the image sensor, a block luminance calculator (151) for dividing a frame of image based on the output signal of the solid-state image pickup device into a set of blocks, calculating a set of luminance indices of respective blocks, an extreme extractor (152) for extracting a block having a highest luminance index, together with the luminance index, a display information generator (153) for generating a set of pieces of image information for exposure guide display including an image representing a region of the extracted block and an image representing the luminance index, an image superposer (160) for superposing the set of pieces of image information for exposure guide display on a frame of image based on the compressed picture signal to generate a frame of superposed image, and a view finder (170) for displaying the frame of superposed image.

12 Claims, 13 Drawing Sheets

VIDEO IMAGE PICKUP APPARATUS AND EXPOSURE GUIDE DISPLAY METHOD

BACKGROUND OF THE INVENTION

1. Field of the Invention

The present invention relates generally to a video image pickup apparatus and an exposure guide display method, and particularly, to a video image pickup apparatus and an exposure guide display method that display information on a luminance detected before a process for "compressing image regions or signal components of a picture signal in a high-luminance interval of an associated signal processing characteristic" (referred herein to as a "high-luminance component compression", "high-luminance region compression", or "high-luminance interval compression", or collectively as a "high-luminance compression").

2. Description of Related Art

There are generally used video image pickup apparatuses such as video cameras that generate a picture signal based on an output signal as a set of pixel signals from a solid-state image pickup device, such as a CCD image sensor or a CMOS image sensor. Those video image pickup apparatuses are adapted to display a histogram for an exposure guide to permit a grasp of a state of exposure due to an aperture and a shutter speed.

There is a technique disclosed in Japanese Patent Application Laid-Open Publication No. 7-38801, which calculates a state of distribution of luminance levels in a taken image, making a graph of a calculated state of luminance level distribution, to superpose on the taken image, to display. There are other techniques disclosed in Japanese Patent Application Laid-Open Publication Nos. 2003-125240 and 2006-295814, which contrive means of indication of contents of a histogram to be displayed to provide useful information for a photographer.

SUMMARY OF THE INVENTION

By the way, video image pickup apparatuses use a solid-state image pickup device that has a dynamic range about 300% or 600% in level of its output signal. However, video image pickup apparatuses have their output signals limited to a white clip point of approximately 109%, and are unable to transmit any exceeding level of signal to subsequent devices. Therefore, video image pickup apparatuses are adapted to perform, besides gamma processes for characteristic correction of RGB components of an output signal from a solid-state image pickup device, a knee process as a high-luminance compression process of a luminance signal after a component conversion to a picture signal.

Accordingly, a knee-processed picture signal is output to a subsequent device, where the knee-processed picture signal is based on to prepare information for exposure guide such as a histogram disclosed in the above-noted patent documents.

Exposure guides based on a knee-processed picture signal are useful for confirmation of a state of the picture signal to be output to a still subsequent device. Instead, they are based on a high-luminance compression, and constitute a difficulty to grasp a real figure of brightness of a subject for a setup of exposure to take an image, as an issue. To this point, there are photographers who have been long familiarized with a shooting by a wider dynamic range than digital video, and have a great desire to set an exposure to take an image as it were on a film shooting.

Further, for photographers who have been familiarized with applying an exposure meter directly on a subject for exposure measurements to set up an exposure of camera, knee-processed and non-linear values on a display seem not to be related to values such as on a spot meter, as an issue.

The present invention has been devised in view of such issues. It therefore is an object of the present invention to provide a video image pickup apparatus and an exposure guide display method allowing for photographers to take a shoot in consciousness of a dynamic range before high-luminance compression.

To achieve the object described, according to a first aspect of the present invention, a video image pickup apparatus comprises a solid-state image pickup device, a high-luminance compression processor configured to perform a high-luminance compression of a first picture signal based on an output signal of the solid-state image pickup device to provide a second picture signal, a block luminance calculator configured to divide a flame of image based on the output signal of the solid-state image pickup device into a set of blocks, and calculate a set of luminance indices of respective blocks, a block extractor configured to extract a first block having a highest luminance index, together with the luminance index thereof, a display information generator configured to generate a set of pieces of image information for exposure guide display including an image representing a region of the first block and an image representing the luminance index thereof an image superposer configured to superpose a frame of image based on the second picture signal and the set of pieces of image information for exposure guide display, on each other, to generate a flame of superposed image, and a display configured to display the flame of superposed image.

It may be preferable for the block extractor to be configured to further extract a second block having a lowest luminance index, together with the luminance index thereof, and for the set of pieces of image information for exposure guide display to further include an image representing a region of the second block and an image representing the luminance index thereof.

To achieve the object described, according to a second aspect of the present invention, a video image pickup apparatus comprises a solid-state image pickup device, a high-luminance compression processor configured to perform a high-luminance compression of a first picture signal based on an output signal of the solid-state image pickup device to provide a second picture signal, a block designation acceptor configured to divide a frame of image based on the output signal of the solid-state image pickup device into a set of blocks, and accept a designation of an arbitrary first block, a block luminance calculator configured to calculate a luminance index of the first block, a display information generator configured to generate a set of pieces of image information for exposure guide display including an image representing a region of the first block and an image representing the luminance index thereof; an image superposer configured to superpose a frame of image based on the second picture signal and the set of pieces of image information for exposure guide display, on each other, to generate a frame of superposed image, and a display configured to display the frame of superposed image.

To achieve the object described, according to a third aspect of the present invention, a video image pickup apparatus comprises a solid-state image pickup device, a high-luminance compression processor configured to perform a high-luminance compression of a first picture signal based on an output signal of the solid-state image pickup device to provide a second picture signal, a block line designation acceptor configured to divide a frame of image based on the output signal of the solid-state image pickup device into a set of blocks, and accept a designation of a block line composed of an arbitrary array of blocks, a block luminance calculator configured to calculate a set of luminance indices of blocks in the block line, a display information generator configured to generate a set of pieces of image information for exposure guide display including an image representing a region of the block line and an image representing the set of luminance indices of blocks in the block line, an image superposed configured to superpose a flame of image based on the second picture signal and the set of pieces of image information for exposure guide display, on each other, to generate a frame of superposed image, and a display configured to display the flame of superposed image.

To achieve the object described, according to a fourth aspect of the present invention, a video image pickup apparatus comprises an imaging device configured to provide a set of pixel signals of a taken image, a knee processor configured to perform a knee process of a first picture signal based on the set of pixel signals to provide a second picture signal, a calculator configured to divide a first frame of image based on the set of pixel signals into a set of blocks, and calculate a set of luminance indices of respective blocks of the set of blocks, an identifier configured to identify an extreme first luminance index in the set of luminance indices, and a first block having the first luminance index in the set of blocks, an image information generator configured to generate a set of pieces of image information including a first piece of image information representing the first luminance index, and a second piece of image information representing a location of the first block in the set of blocks, an image superposer configured to superpose at least a subset of the set of pieces of image information on a second frame of image based on the second picture signal to provide a third frame of image, and a display configured to display the third frame of image for an exposure guide.

To achieve the object described, according to a fifth aspect of the present invention, an exposure guide display method comprises the steps of performing a high-luminance compression of a first picture signal based on an output signal of a solid-state image pickup device to provide a second picture signal, dividing a flame of image based on the output signal of the solid-state image pickup device into a set of blocks, calculating a set of luminance indices of respective blocks, extracting a first block having a highest luminance index, together with the luminance index thereof, generating a set of pieces of image information for exposure guide display including an image representing a region of the first block and an image representing the luminance index thereof, superposing a frame of image based on the second picture signal and the set of pieces of image information for exposure guide display, on each other, to generate a frame of superposed image, and displaying the flame of superposed image.

It may be preferable for the extracting to comprise further extracting a second block having a lowest luminance index, together with the luminance index thereof, and for the set of pieces of image information for exposure guide display to further includes an image representing a region of the second block and an image representing the luminance index thereof.

To achieve the object described, according to a sixth aspect of the present invention, an exposure guide display method comprises the steps of performing a high-luminance compression of a first picture signal based on an output signal of a solid-state image pickup device to provide a second picture signal, dividing a frame of image based on the output signal of the solid-state image pickup device into a set of blocks, accepting a designation of an arbitrary first block, calculating a luminance index of the first block, generating a set of pieces of image information for exposure guide display including an image representing a region of the first block and an image representing the luminance index thereof, superposing a frame of image based on the second picture signal and the set of pieces of image information for exposure guide display, on each other, to generate a frame of superposed image, and displaying the frame of superposed image.

To achieve the object described, according to a seventh aspect of the present invention, an exposure guide display method comprises the steps of performing a high-luminance compression of a first picture signal based on an output signal of a solid-state image pickup device to provide a second picture signal, dividing a frame of image based on the output signal of the solid-state image pickup device into a set of blocks, accepting a designation of a block line composed of an arbitrary array of blocks, calculating a set of luminance indices of blocks in the block line, generating a set of pieces of image information for exposure guide display including an image representing a region of the block line and an image representing the set of luminance indices of blocks in the block line, superposing a frame of image based on the second picture signal and the set of pieces of image information for exposure guide display, on each other, to generate a frame of superposed image, and displaying the frame of superposed image.

To achieve the object described, according to an eighth aspect of the present invention, an exposure guide display method comprises the steps of providing a set of pixel signals of a taken image, performing a knee process of a first picture signal based on the set of pixel signals to provide a second picture signal, dividing a first frame of image based on the set of pixel signals into a set of blocks, calculating a set of luminance indices of respective blocks of the set of blocks, identifying an extreme first luminance index in the set of luminance indices, and a first block having the first luminance index in the set of blocks, generating a set of pieces of image information including a first piece of image information representing the first luminance index, and a second piece of image information representing a location of the first block in the set of blocks, superposing at least a subset of the set of pieces of image information on a second frame of image based on the second picture signal to provide a third frame of image, and displaying the third frame of image for an exposure guide.

DETAILED DESCRIPTION OF THE PREFERRED EMBODIMENTS

There will be described below into details the preferred embodiments of the present invention, with reference to the accompanying drawings.

First Embodiment

Figure 1:
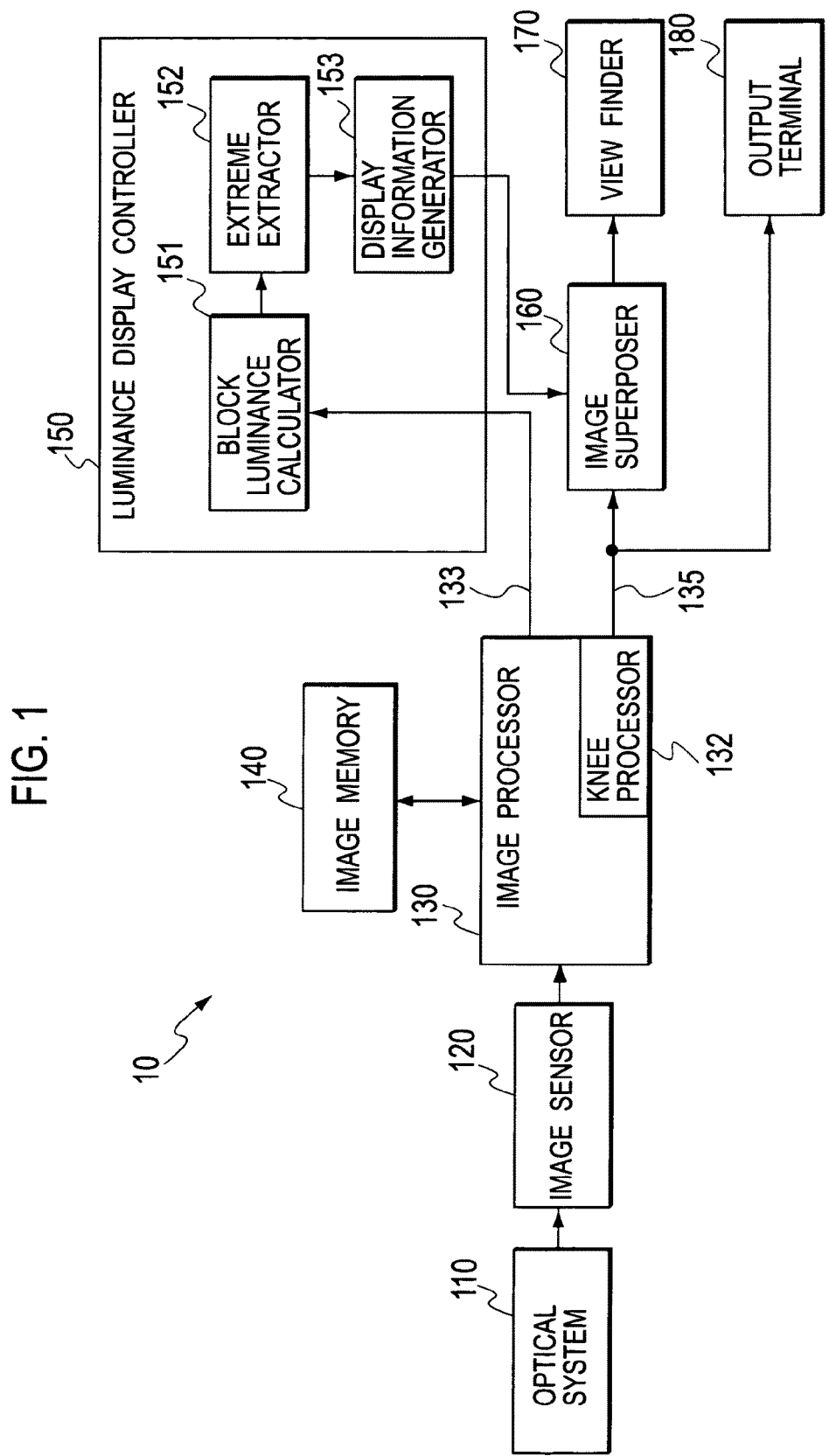
FIG. 1 is a block diagram of a video image pickup apparatus according to a first embodiment of the present invention.

FIG. 1 is a configuration-illustrating block diagram of a video image pickup apparatus 10 according to a first embodiment of the present invention. As illustrated in the figure, the video image pickup apparatus 10 includes an optical system 110, an image sensor 120, an image processor 130, an image memory 140, a luminance display controller 150, an image superposer 160, a view finder 170, and an output terminal 180.

The optical system 110 is configured with a lens, a shutter, an aperture, a focus mechanism, a zoom mechanism, and the like, to control flux of light to be picked up for an exposure to the image sensor 120. The exposure depending on the aperture value as well as the shutter speed has a great effect on the presentation mode of a picked-up image, and can be set up not simply by a manual operation of a photographer, but also by an automatic control of the video image pickup apparatus 10.

The image sensor 120 is an image-taking solid-state device adapted for photoelectric conversion, and may be made up by a CMOS (Complementary Metal Oxide Semiconductor) or CCD (Charge Coupled Device) image sensor. To output a signal, the image sensor 120 is adapted for a dynamic range of signal levels about 300%. Instead, this may be a dynamic range about 600% in accordance with the setting or specification.

The image processor 130 is adapted for processes such as an A/D conversion, filtering, and color conversion of an output signal of the image sensor 120 to generate a picture signal, and may be configured with an appropriate processor such as a DSP (Digital Signal Processor). As a working area therefore, employed is the image memory 140. The image processor 130 includes a knee processor 132, and is adapted to output a knee-processed picture signal through an image data bus 135.

Figure 2:
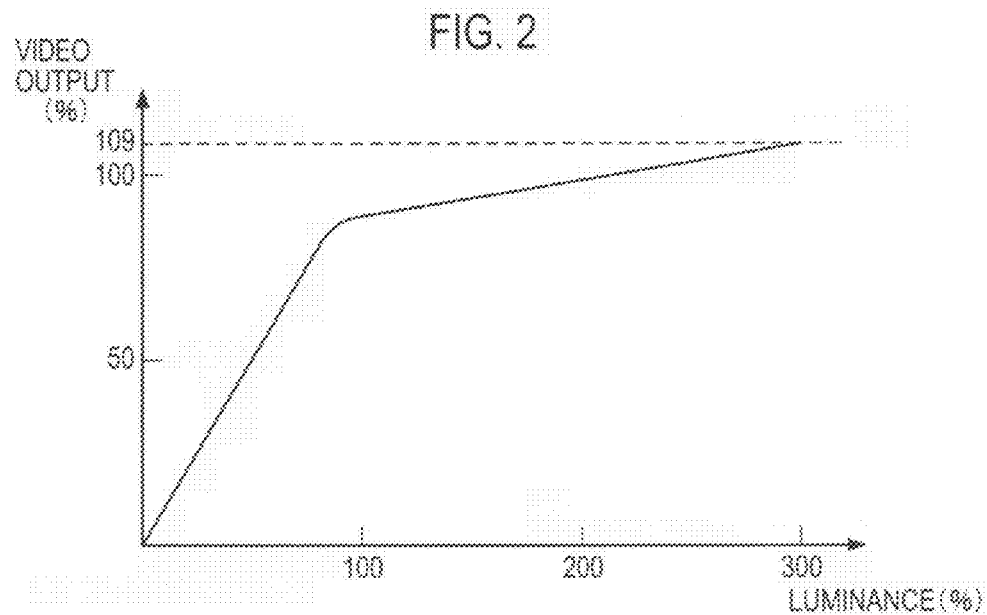
FIG. 2 is a graph for explanation of a knee process.

The knee processor 132 is adapted for a knee process, which is a process for a compression of signals in a high-luminance interval to accommodate those signals output from the image sensor 120 at levels within a dynamic range about 300%, in a dynamic range of approximately 109% of the video output, as illuated in FIG. 2. The knee process has a typical characteristic that is linear in a low-luminance interval and turned, at a point on the way to the high-luminance interval, to knee for the compression of input signals. The turning point is referred to as a knee point, typically set within a range of 85% to 100%. Past the knee point, the characteristic has a gradient referred to as a knee slope.

In the present embodiment, the image processor 130 is configured also to have a picture signal output without being knee-processed at the knee processor 132, that is, to output via an image data bus 133 a picture signal of a dynamic range about 300% before the knee process. There may be a set of data sampled just after the A/D conversion, to output as the picture signal to the image data bus 133.

The pre-knee picture signal output to the image data bus 133 is input to the luminance display controller 150. The luminance display controller 150 is adapted for processing a pre-knee picture signal of a dynamic range about 300% to generate a frame of image to be displayed for an exposure guide. It is noted that the knee process is a process for compression of signals of high-luminance regions of a photogenic subject, it is difficult to grasp a real figure of brilliance of the subject from a post-knee picture. Accordingly, in the present embodiment, the display for exposure guide is based on a pre-knee picture signal.

More specifically, the luminance display controller 150 is configured to divide a frame of image based on a picture signal into a plurality of blocks, and calculate luminance indices of respective blocks. Further, it is configured to extract a block that has a highest luminance index and a block that has a lowest luminance index, together with their luminance indices, and generate a frame of image indicating regions of the blocks and the luminance indices. Accordingly, the luminance display controller 150 is configured with a block luminance calculator 151, an extreme extractor 152, and a display information generator 153.

Figure 3:
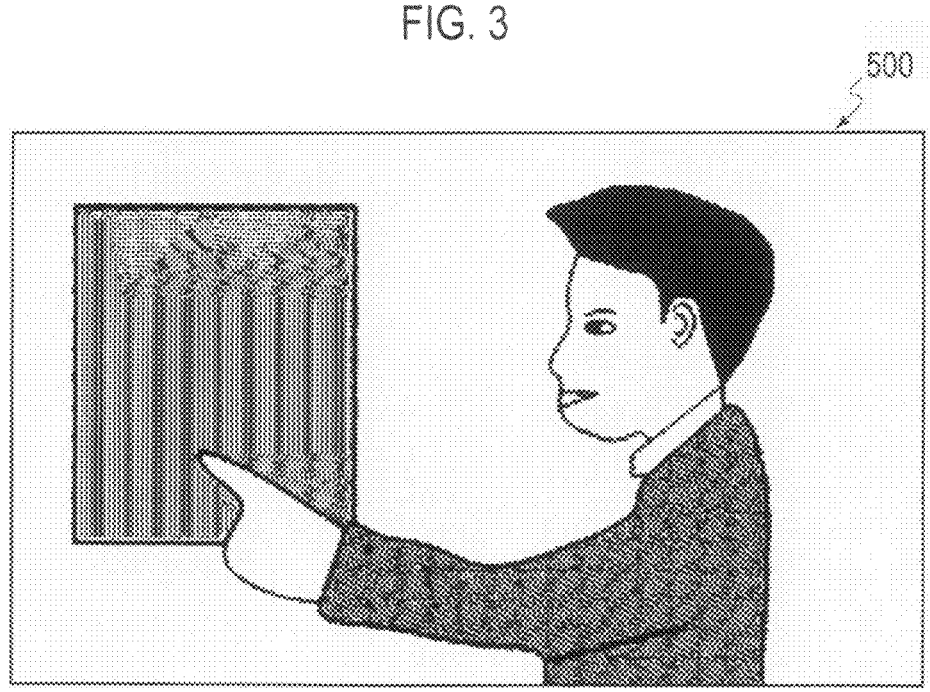
FIG. 3 is an illustration of a frame of image based on a non-kneed picture signal.
Figure 4:
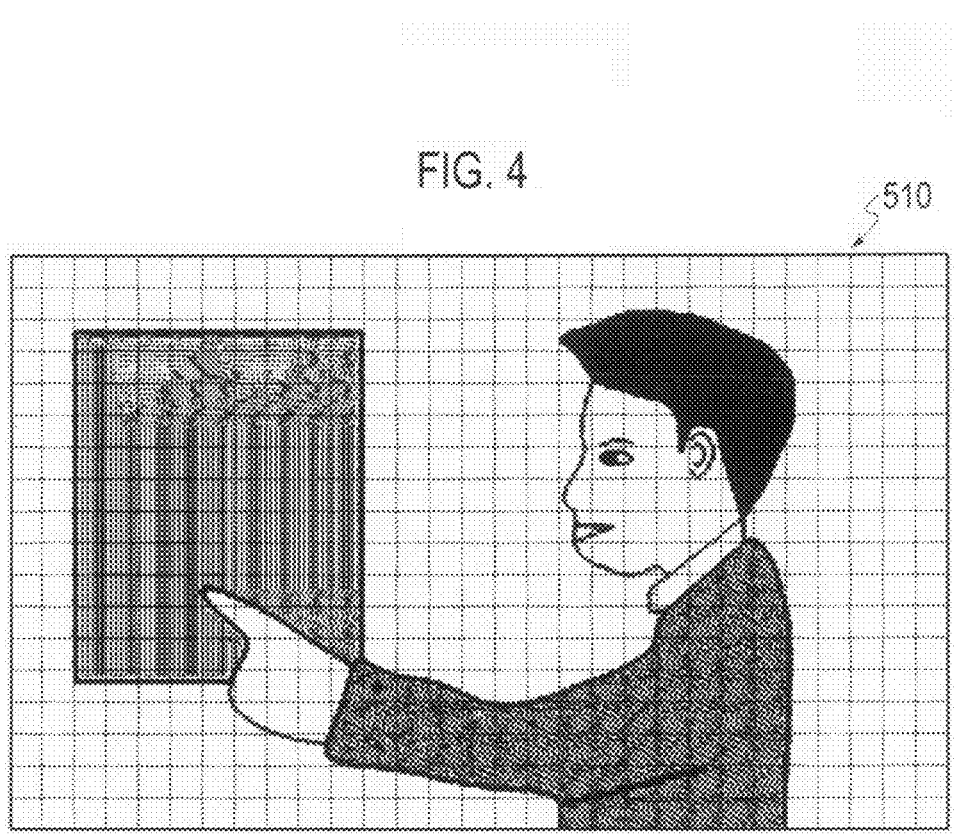
FIG. 4 is an illustration of a frame of image divided into a set of blocks.

For instance, the block luminance calculator 151 is adapted to divide such a frame of image 500 based on a non-kneed picture signal as illustrated in FIG. 3, into a plurality of blocks as illustrated in a frame of image 510 in FIG. 4, and calculate a luminance index of each block. The number of divided blocks may depend on a variety of conditions such as a processing capacity and a viewability of the video image pickup apparatus 10. The luminance index may be an average luminance or a maximal luminance of pixels in the block, for instance.

The extreme extractor 152 is adapted to extract, from among those blocks having luminance indices calculated by the block luminance calculator 151, that block which has a highest luminance index and that block which has a lowest luminance index, together with their luminance indices. It may extract a block having a highest luminance index or a block having a lowest luminance index. In particular, when a high-luminance region is noticed, simply a block having a highest luminance index may be extracted together with the luminance index.

The display information generator 153 is adapted to generate, as a set of pieces of image information to be displayed for exposure guide, a frame of image that indicates cursor images representing a block having a highest luminance index and a block having a lowest luminance index, and luminance indices of the block highest in value of luminance index and the block lowest in value of luminance index, as they are extracted by the extreme extractor 152.

The image superposer 160 is adapted to superpose a frame of image that is generated by the display information generator 153 to display for exposure guide, and a frame of image that is based on a post-knee picture signal output from the image processor 130 through the image data bus 135, on each other to output to the view finder 170.

Figure 5:
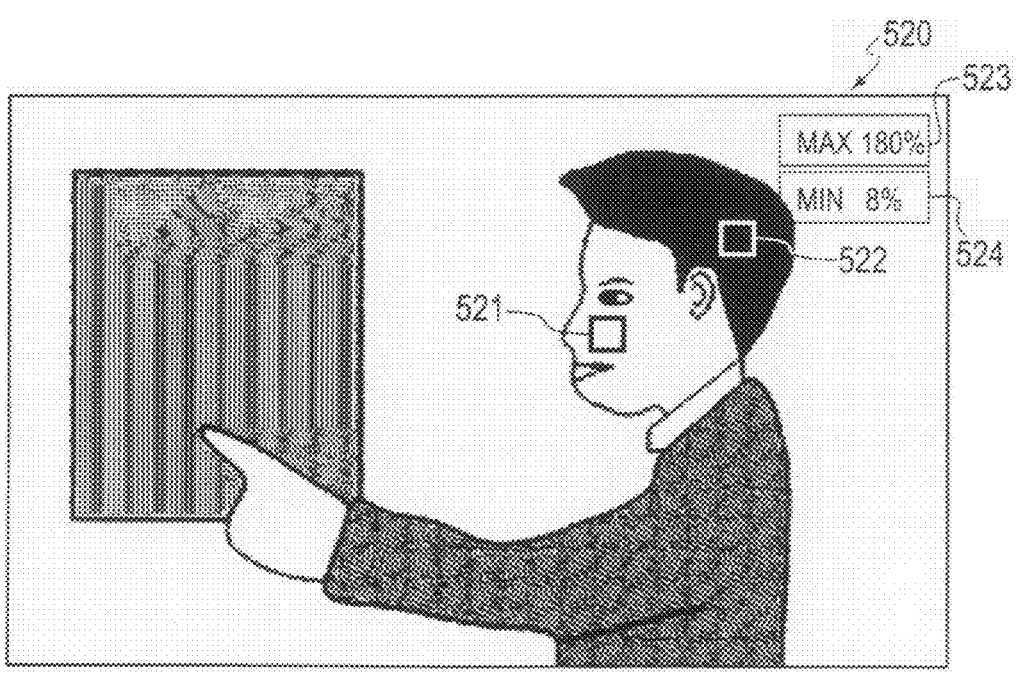
FIG. 5 is an illustration of a frame of superposed image as output from an image superposer and displayed on a view finder.

FIG. 5 is an illustration of a frame of exemplary image 520 to be output from the image superposer 160. This image frame 520 is to be displayed on the view finder 170. In this figure, a frame of image based on a post-knee picture signal has superposed thereon a combination of a cursor 521 representing a block having a highest luminance index, a cursor 522 representing a block having a lowest luminance index, a luminance index 523 of the block highest in value of luminance index, and a luminance index 524 of the block lowest in value of luminance index, as they are generated by the display information generator 153, to display on the view finder 170.

The cursors may be colored, adjusted in size, or shadowed, to display for a facilitated recognition of the photographer. For the display for exposure guide, it is desirable to enable adjustments such as of update timing or response, for an increased usability.

The photographer may refer to pieces of information for exposure guide of a non-kneed picture image, as they are displayed on the view finder 170, to thereby grasp a real brilliance of a subject, which permits an exposure setting and an image pickup to be performed as though they were in a shot by a film with a wide dynamic range. For instance, references to exposure guide information permit aperture adjustments such as those to set a luminance signal level of subject substantially to saturation, or to reduce a background luminance. Such actions enable a picture to be taken with a luminance fine-adjusted as intended by the photographer.

The output terminal 180 is adapted to input a post-knee picture signal output though the image data bus 135, for a transmission of picture signal to a device in a subsequent stage. The exposure guide is a set of pieces of information for photographer, and those to be displayed for exposure guide are excluded from the picture signal to be output from the output terminal 180. It is noted that the video image pickup apparatus 10 may have a built-in recorder for recording picture signals to be output from the output terminal 180.

Figure 6:
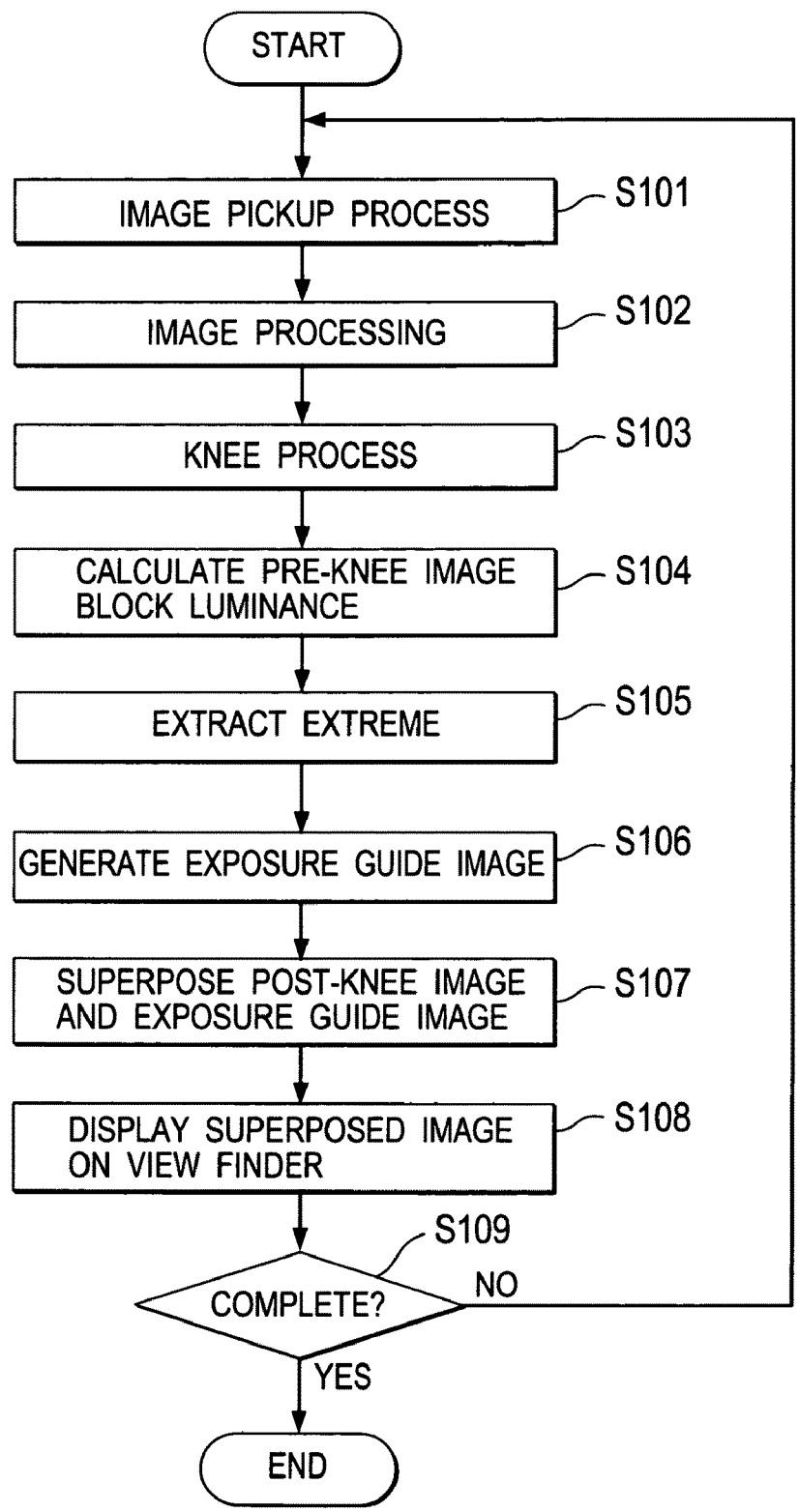
FIG. 6 is a flowchart of processes according to the first embodiment

FIG. 6 is a flowchart of processes in the video image pickup apparatus 10 according to the first embodiment. The video image pickup apparatus 10 is adapted to accept a setting of mode, and when a mode for displaying an exposure guide indicating a maximal luminance and a minimal luminance is set by a photographer, the following processes are performed.

The optical system 110 and the image sensor 120 cooperatively perform an image pickup process (S101), whereby a picture signal is sent to the image processor 130. The image processor 130 performs an A/D conversion, a filtering process, a color conversion process, and the like, for an image processing to generate a picture signal, to output to the luminance display controller 150.

The image processor 130 further generates a kneed picture signal (S103), to output to the image superposer 160 and the output terminal 180. A picture signal output to the output terminal 180 is transmitted to a device in a subsequent stage.

A frame of image based on a pre-knee picture signal is sent to the luminance display controller 150, where the block luminance calculator 151 divides it into blocks in a prescribed manner and calculates a luminance index of each block (S104). The luminance index may be an average luminance index or a maximal luminance index of pixels in the block, as described. And, the extreme extractor 152 extracts a block that has a highest luminance index, and a block that has a lowest luminance index, together with their luminance indices (S105). Next, the display information generator 153 generates, as a set of pieces of image information to be displayed for exposure guide, a frame of image that indicates cursor images representing a block having a highest luminance index and a block having a lowest luminance index, and luminance indices of the block highest in value of luminance index and the block lowest in value of luminance index, as they are extracted by the extreme extractor 152 (S106).

The image superposer 160 superposes a frame of image that is based on a post-knee picture signal input through the image data bus 135, and a flame of image for exposure guide display that is input from the luminance display controller 150 (S107). And, the view finder 170 displays a picture of the post-knee image frame with the image frame for exposure guide display superposed thereon (S108). The foregoing processes are repeated till a complete imaging (S109: Yes), thereby permitting the photographer to acquire real-time exposure guide information.

As will be seen from the foregoing description, according to the first embodiment, the photographer is enabled to refer to an exposure guide with respect to luminance-extreme blocks in a frame of image of non-compressed high-luminance regions displayed on a display means to thereby grasp a real brilliance of a subject allowing even for the video image pickup apparatus to implement an exposure setting and an image pickup as though they were in a shot by a film with a wide dynamic range.

Second Embodiment

Figure 7:
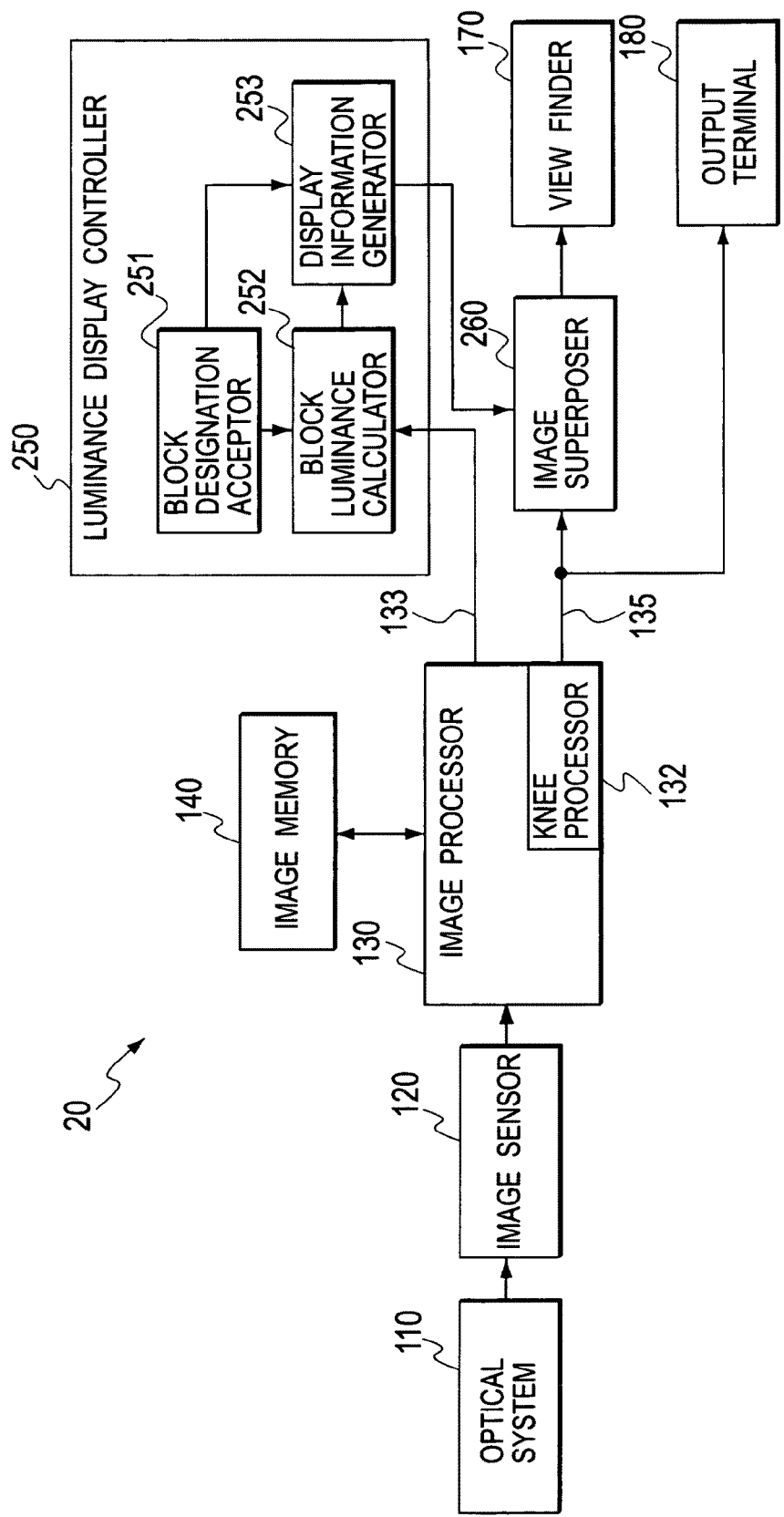
FIG. 7 is a block diagram of a video image pickup apparatus according to a second embodiment of the present invention.

FIG. 7 is a configuration-illustrating block diagram of a video image pickup apparatus 20 according to a second embodiment of the present invention. It is noted that like components to the first embodiment are designated by like reference characters to eliminate redundancy. As illustrated in the figure, the video image pickup apparatus 20 includes an optical system 110, an image sensor 120, an image processor 130, an image memory 140, a luminance display controller 250, an image superposer 260, a view finder 170, an output terminal 180, an image data bus 133, and an image data bus 135.

The optical system 110, image sensor 120, image processor 130, view finder 170, output terminal 180, image data bus 133, and image data bus 135 are alike to those in the first embodiment, and the image processor 130 includes a knee processor 132 like the first embodiment.

A pre-knee picture signal output from the image processor 130 to the image data bus 133 is input to the luminance display controller 250. The luminance display controller 250 is configured to divide a frame of image based on the picture signal into a plurality of blocks, and accept a designation of an arbitrary block from a photographer. Further, it is configured to set the designated block as a luminance display target block, and calculate a luminance index of the set block. Still further, it is configured to generate a flame of image indicating a region of the luminance display target block and the luminance index. Accordingly, the luminance display controller 250 is configured with a block designation acceptor 251, a block luminance calculator 252, and a display information generator 253.

Figure 8:
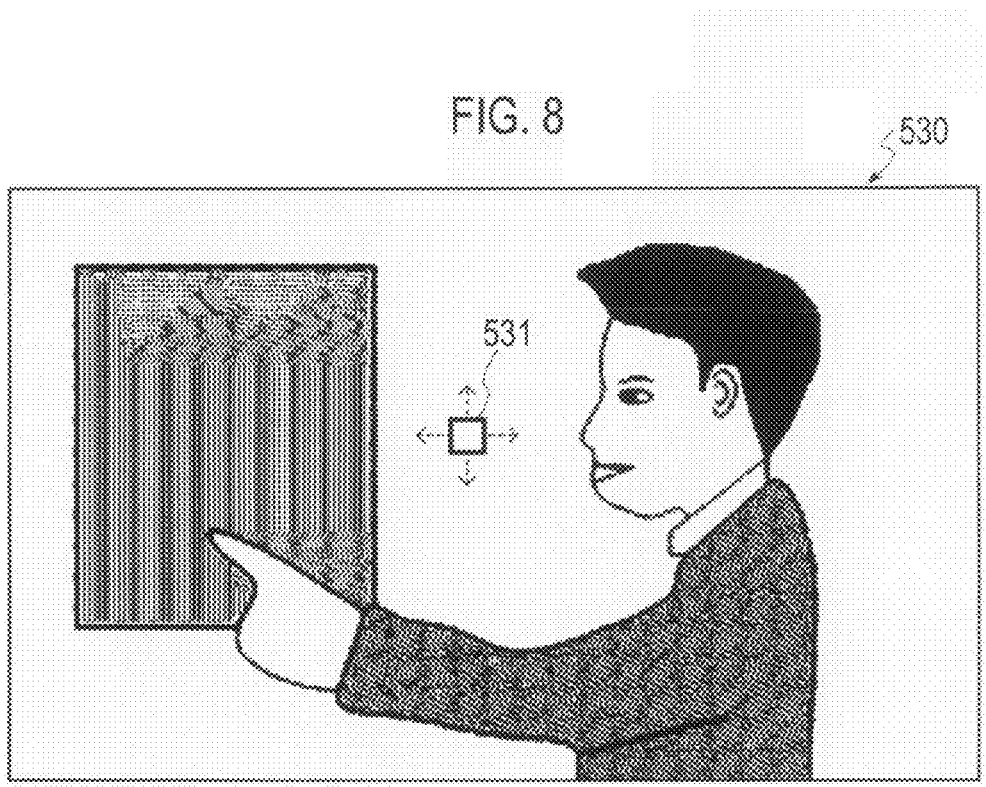
FIG. 8 is an illustration of a frame of image to accept a designation of a luminance display target block.

As illustrated by a flame of image 530 in FIG. 8, for instance, the block designation acceptor 251 is adapted to superpose a block-correspondent cursor 531 on a picture, to display on the view finder 170. This cursor 531 is movable vertically and horizontally in accordance with an instruction from the photographer. The photographer can operate an operation key (not shown) provided on the video image pickup apparatus 20, for instance, to make a displacement of luminance display target block to an arbitrary block. The video image pickup apparatus 20 is configured to have an operation mode for accepting such an operation of the photographer. During the operation mode, the cursor may be blinked or changed in color, for instance, thereby allowing for an enhanced operational feeling of the photographer.

The block luminance calculator 252 is adapted to calculate a luminance index of the luminance display target block. For the luminance index calculation, a non-kneed picture signal of a dynamic range about 300% is employed. The luminance index to be used may be an average luminance or a maximal luminance of pixels in the block, for instance.

The display information generator 253 is adapted to generate, as a set of pieces of image information to be displayed for exposure guide, a frame of image that indicates a cursor image representing a block set as a luminance display target block by the block designation acceptor 251, and a luminance index of the luminance display target block.

The image superposer 260 is adapted to superpose a frame of image that is generated by the display information generator 253 to display for exposure guide, and a frame of image that is based on a post-knee picture signal output from the image processor 130 through the image data bus 135, on each other to output to the view finder 170.

Figure 9:
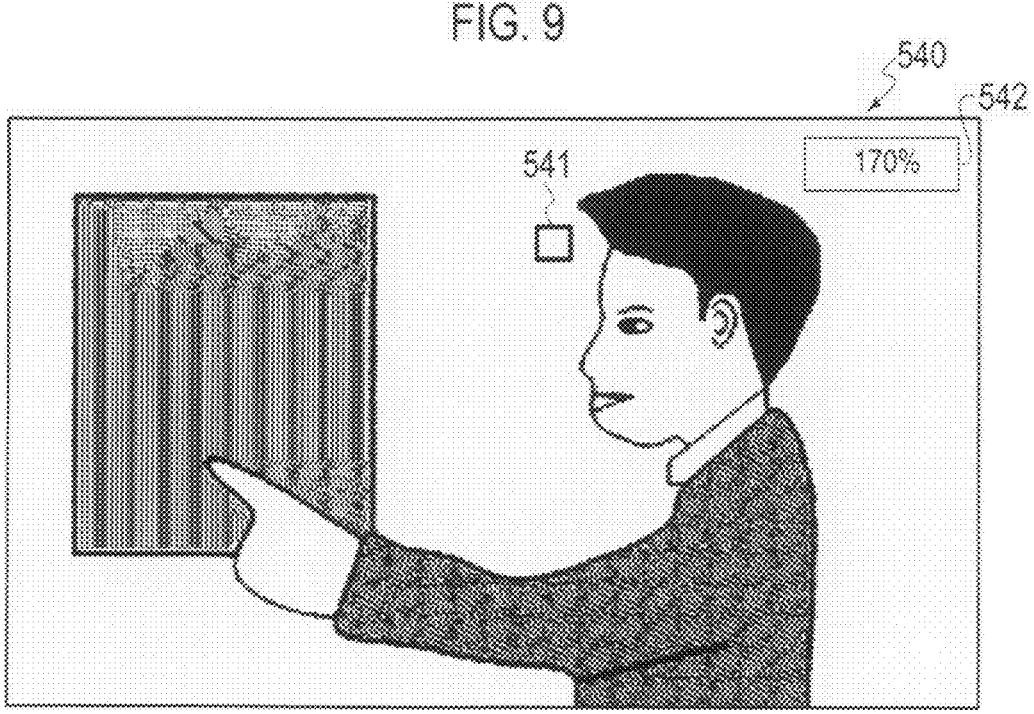
FIG. 9 is an illustration of a frame of superposed image as output from an image superposer and displayed on a view finder.

FIG. 9 is an illustration of a frame of exemplary image 540 to be output from the image superposer 160. This image frame 540 is to be displayed on the view finder 170. In this figure, a frame of image based on a post-knee picture signal has superposed thereon a combination of a cursor 541 representing a luminance display target block generated by the display information generator 153, and a luminance index 542 of the luminance display target block, to display on the view finder 170.

The cursor 541 may be colored, adjusted in size, or shadowed, to display for a facilitated recognition of the photographer. For the display for exposure guide, it is desirable to enable adjustments such as of update timing or response, for an increased usability.

The photographer may refer to pieces of information for exposure guide of a non-kneed picture image, as they are displayed on the view finder 170, to thereby grasp a real brilliance of a subject corresponding to an arbitrarily designative luminance display target block, which permits an exposure setting and an image pickup to be performed as though they were in a shot by a film with a wide dynamic range. For instance, references to exposure guide information permit aperture adjustments such as those to set a luminance signal level of subject substantially to saturation, or to reduce a background luminance. Such actions enable a picture to be taken with a luminance fine-adjusted as intended by the photographer.

The output terminal 180 is adapted to input a post-knee picture signal output through the image data bus 135, for a transmission of picture signal to a device in a subsequent stage. The exposure guide is a set of pieces of information for photographer, and those to be displayed for exposure guide are excluded from the picture signal to be output from the output terminal 180. It is noted that the video image pickup apparatus 20 may have a built-in recorder for recording picture signals to be output from the output terminal 180.

Figure 10:
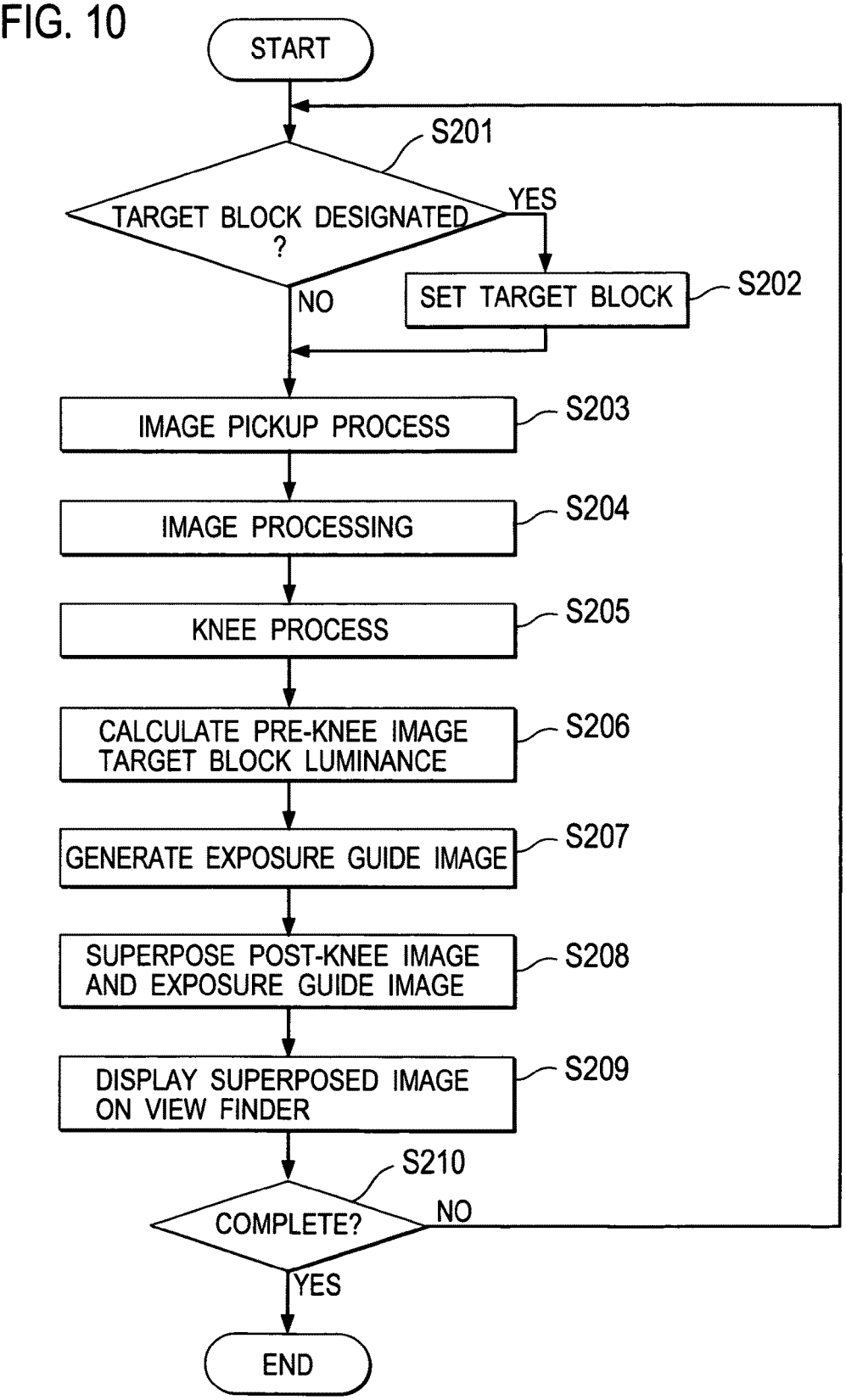
FIG. 10 is a flowchart of processes according to the second embodiment

FIG. 10 is a flowchart of processes in the video image pickup apparatus 20 according to the second embodiment. The video image pickup apparatus 20 is adapted to accept a setting of mode, and when a mode for displaying an exposure guide indicating a luminance display target block is set by a photographer, the following processes are performed.

If a designation of a luminance display target block by a photographer is accepted (S201: Yes), the luminance display target block is set in accordance with the photographer's operation (S202). It is noted that the designation of luminance display target block can be accepted by a prescribed operation. If no designation of luminance display target block is accepted (S201: No), a default or as-set luminance display target block is to be taken over.

The optical system 110 and the image sensor 120 cooperatively perform an image pickup process (S203), whereby a picture signal is sent to the image processor 130. The image processor 130 performs an A/D conversion, a filtering process, a color conversion process, and the like, for an image processing to generate a picture signal, to output to the luminance display controller 250.

The image processor 130 further generates a kneed picture signal (S205), to output to the image superposer 260 and the output terminal 180. A picture signal output to the output terminal 180 is transmitted to a device in a subsequent stage.

A frame of image based on a pre-knee picture signal is sent to the luminance display controller 250, where the block luminance calculator 252 calculates a luminance index of the luminance display target block (S206). And, the display information generator 253 generates, as a set of pieces of image information to be displayed for exposure guide, a frame of image that indicates a cursor image representing the luminance display target block and a luminance index of the luminance display target block (S207).

The image superposer 260 superposes a frame of image that is based on a post-knee picture signal input through the image data bus 135, and a frame of image for exposure guide display that is input from the luminance display controller 250 (S208). And, the view finder 170 displays a picture of the post-knee image frame with the image frame for exposure guide display superposed thereon (S209). The foregoing processes are repeated till a complete imaging (S210: Yes), thereby permitting the photographer to acquire real-time exposure guide information of an arbitrarily designative luminance display target block.

As will be seen from the foregoing description, according to the second embodiment, the photographer is enabled to refer to an exposure guide with respect to an arbitrarily designative block in a frame of image of non-compressed high-luminance regions displayed on a display means, to thereby grasp a real brilliance of a subject allowing even for the video image pickup apparatus to implement an exposure setting and an image pickup as though they were in a shot by a film with a wide dynamic range.

Third Embodiment

Figure 11:
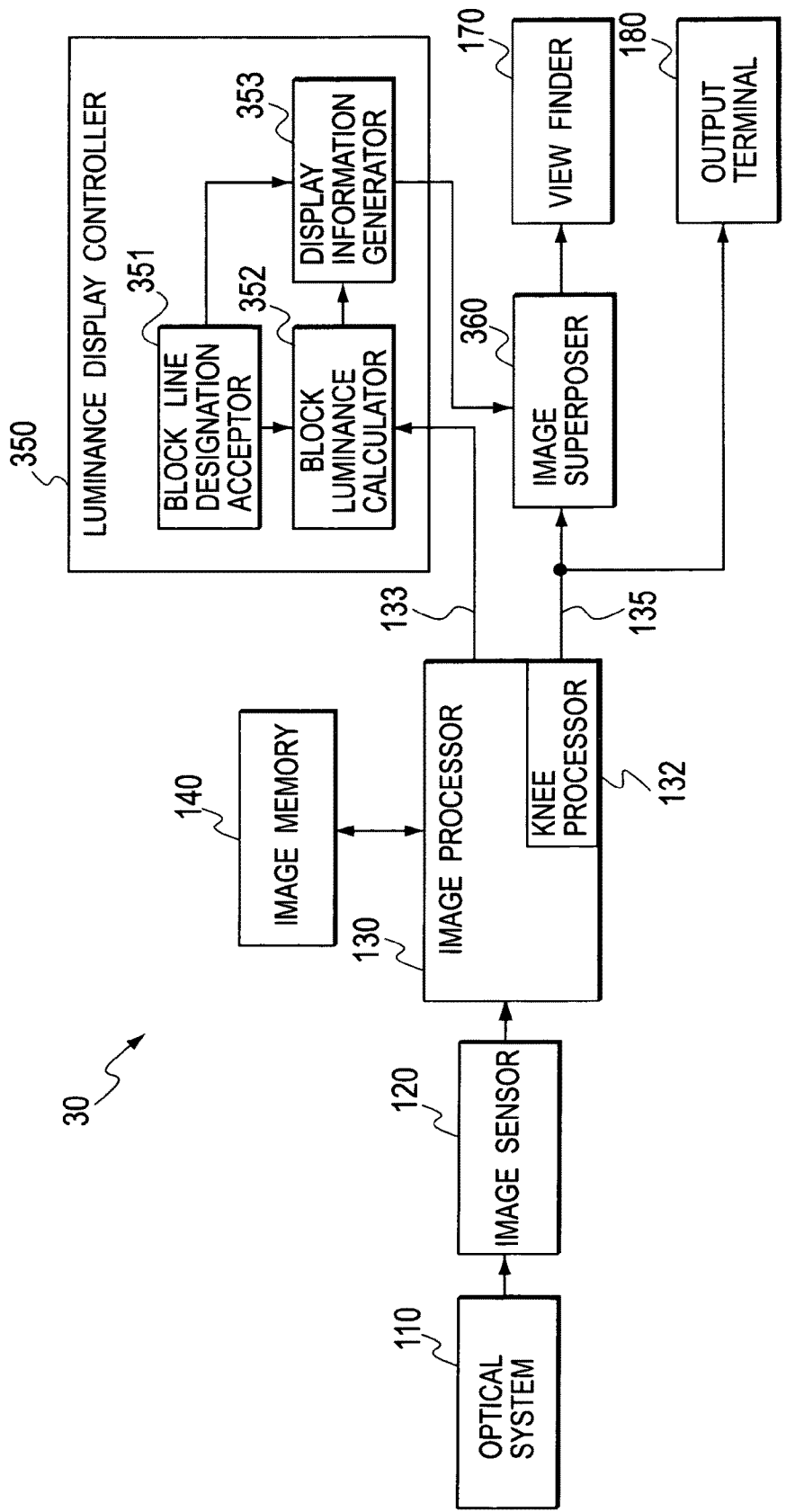
FIG. 11 is a block diagram of a video image pickup apparatus according to a third embodiment of the present invention.

FIG. 11 is a configuration-illustrating block diagram of a video image pickup apparatus 30 according to a third embodiment of the present invention. It is noted that like components to the first embodiment are designated by like reference characters to eliminate redundancy. As illustrated in the figure, the video image pickup apparatus 30 includes an optical system 110, an image sensor 120, an image processor 130, an image memory 140, a luminance display controller 350, an image superposer 360, a view finder 170, an output terminal 180, an image data bus 133, and an image data bus 135.

The optical system 110, image sensor 120, image processor 130, view finder 170, output terminal 180, image data bus 133, and image data bus 135 are alike to those in the first embodiment, and the image processor 130 includes a knee processor 132 like the first embodiment.

A pre-knee picture signal output from the image processor 130 to the image data bus 133 is input to the luminance display controller 350. The luminance display controller 350 is configured to divide a flame of image based on the picture signal into a plurality of blocks, and accept a designation of an arbitrary block line from a photographer. Further, it is configured to set the designated block line as a luminance display target block line, and calculate a luminance index of each block in the set block line. Still further, it is configured to generate a combination of a line cursor that represents a region of the luminance display target block line, and a graphic image that represents a set of luminance indices of blocks included in the luminance display target block line. Accordingly, the luminance display controller 350 is configured with a block line designation acceptor 351, a block luminance calculator 352, and a display information generator 353.

Figure 12:
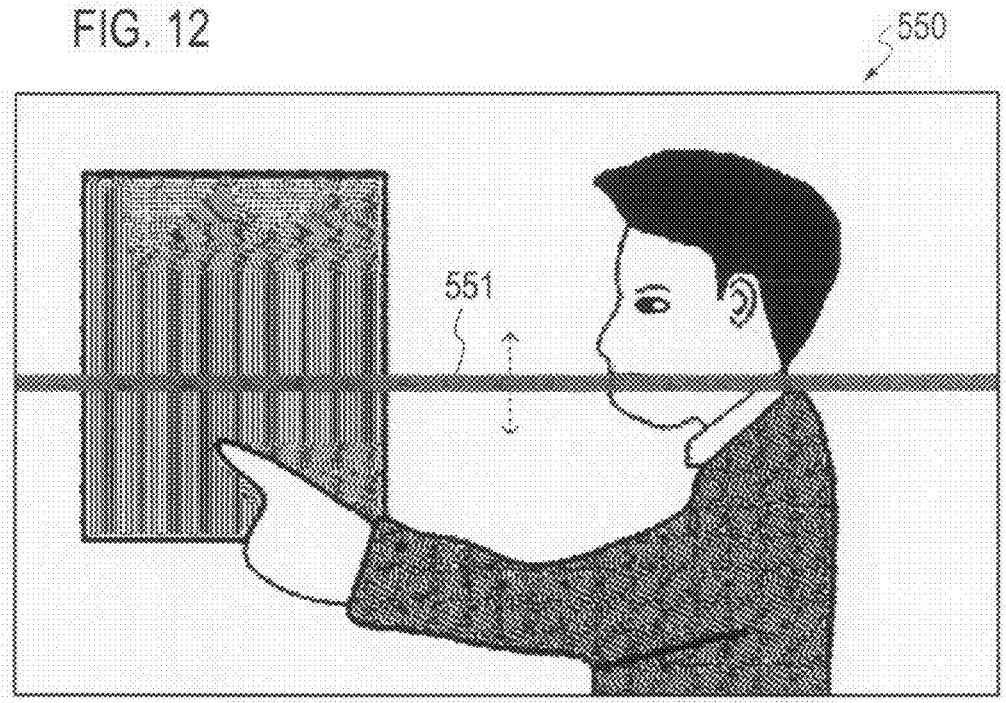
FIG. 12 is an illustration of a frame of image to accept a designation of a luminance display target block line.

As illustrated by a frame of image 550 in FIG. 12, for instance, the block line designation acceptor 351 is adapted to superpose a block line-correspondent line cursor 551 on a picture, to display on the view finder 170. This line cursor 551 is vertically movable in accordance with an instruction from the photographer. The photographer can operate an operation key (not shown) provided on the video image pickup apparatus 30, for instance, to make a displacement of luminance display target block line to an arbitrary block line. The video image pickup apparatus 30 is configured to have an operation mode for accepting such an operation of the photographer. During the operation mode, the line cursor may be blinked or changed in color, for instance, thereby allowing for an enhanced operational feeling of the photographer.

The block luminance calculator 352 is adapted to calculate luminance indices of blocks included in the luminance display target block line, on a block-by-block basis. For the luminance index calculation, a non-kneed picture signal of a dynamic range about 300% is employed. The luminance index to be used may be an average luminance or a maximal luminance of pixels in the block, for instance.

The display information generator 353 is adapted to generate, as a set of pieces of image information to be displayed for exposure guide, a combination of a line cursor as an image representing a block line that is set up as a luminance display target block line by the block line designation acceptor 351, and a graph as an image representing a set of luminance indices of blocks in the luminance display target block line.

The image superposer 360 is adapted to superpose or combine: at least a subset or subsets of a set of pieces of image information generated by the display information generator 353 to display for exposure guide; and a frame of image based on a post-knee picture signal output from the image processor 130 through the image data bus 135, on or with each other, as necessary, to output to the view finder 170.

Figure 13:
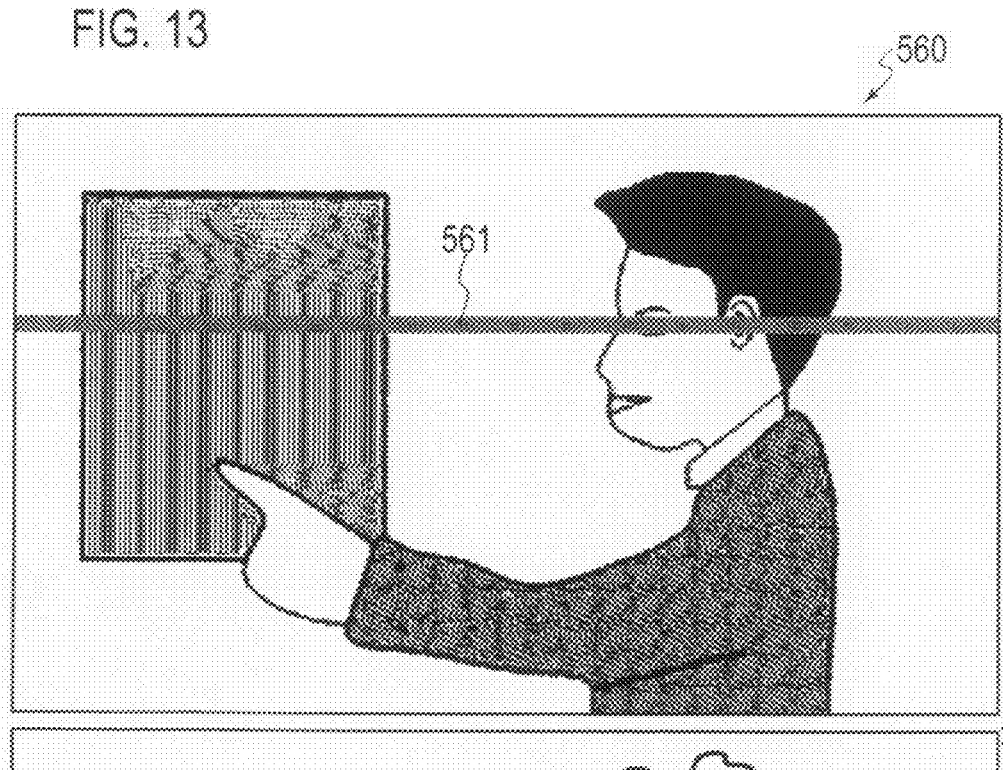
FIG. 13 is an illustration of a frame of superposed image as output from an image superposer and displayed on a view finder according to the third embodiment.

FIG. 13 is an illustration of a frame of image 560 as an example to be output from the image superposer 160. This image frame 560 is to be displayed on the view finder 170. In this figure, a frame of image based on a post-knee picture signal has: superposed thereon a line cursor 561 representing a luminance display target block line, as it is generated by the display information generator 153; and combined therewith a graph 562 representing a set of luminance indices of blocks in the luminance display target block line, as it is generated by the display information generator 153, to display on the view finder 170.

The graph 562 is thus displayed below the frame of image based on a post-knee picture signal, not to be superposed thereon. This graph 562 indicates a line graph that represents luminance indices of blocks in a luminance display target block line behind the line cursor 561, at locations corresponding thereto, in their order. In the graph, the vertical axis represents a range of luminance levels between 0% and 300%. The greater the block luminance index is, the higher the level in graph becomes.

The line cursor 561 as well as the graph 562 may be colored, adjusted in size, or shadowed, to display for a facilitated recognition of the photographer. For the display for exposure guide, it is desirable to enable adjustments such as of update timing or response, for an increased usability.

Figure 14:
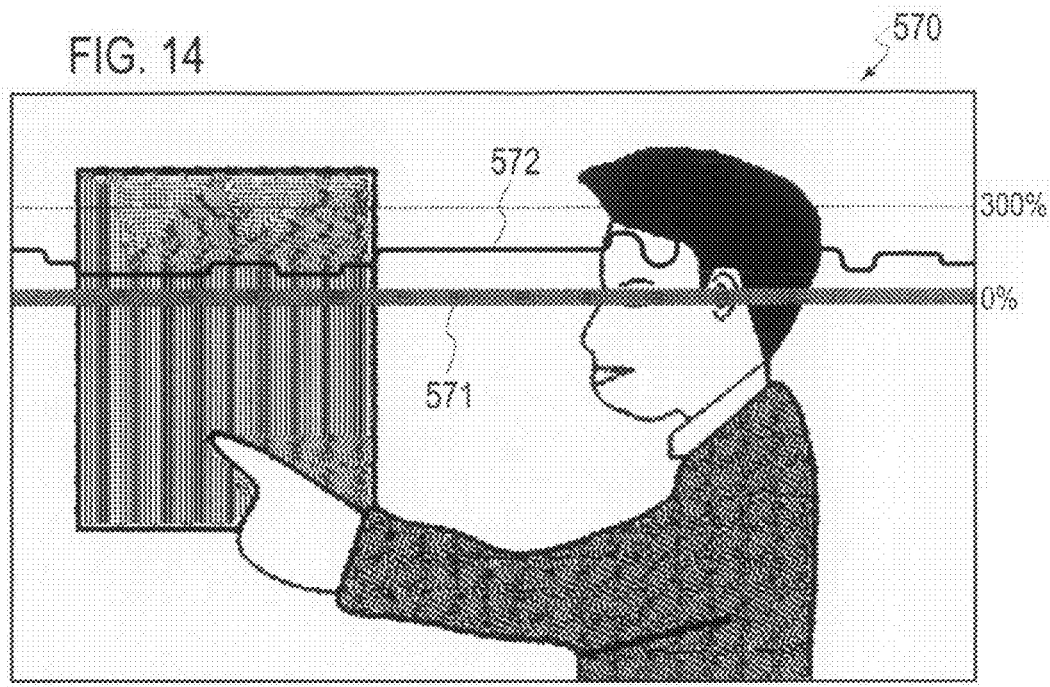
FIG. 14 is another illustration of a frame of superposed image as output from the image superposer and displayed on the view finder according to the third embodiment.

FIG. 14 is an illustration of a flame of image 570 as another example to be output from the image superposer 160. The frame of image 570 includes a graph 572 displayed above a line cursor 571, to be superposed on a frame of image based on a post-knee picture signal. The graph 572 also indicates a line graph that represents luminance indices of blocks in a luminance display target block line behind the line cursor 571, at locations corresponding thereto, in their order.

Figure 15:
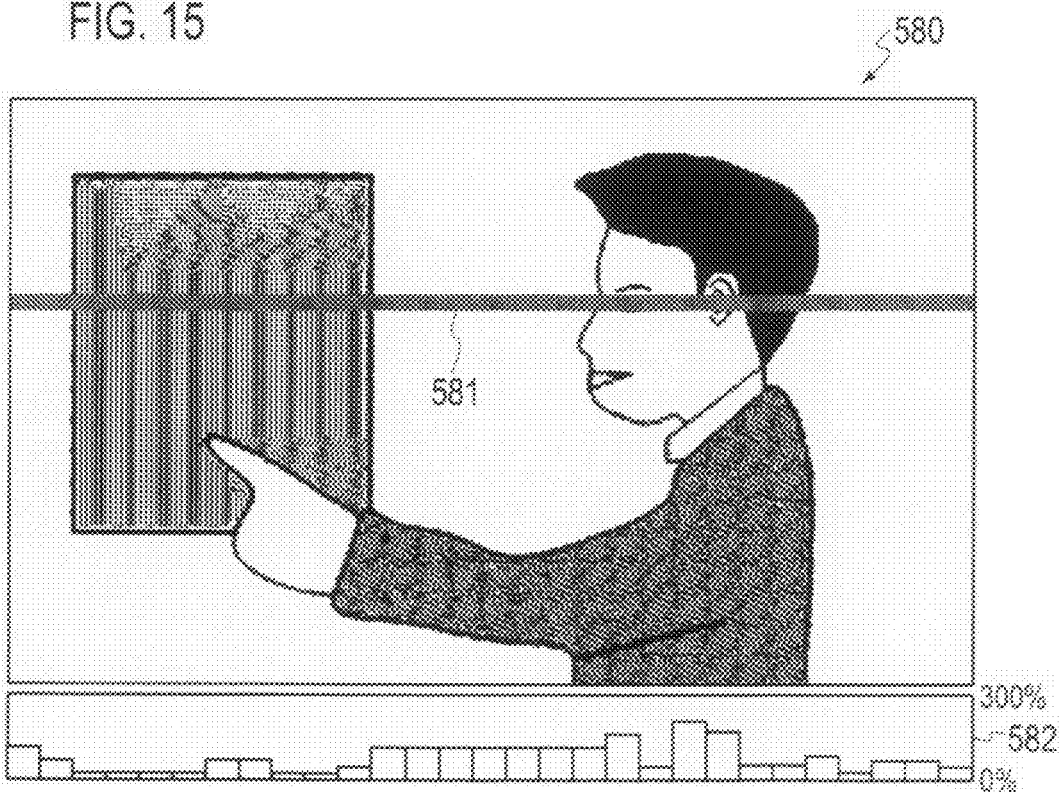
FIG. 15 is another illustration of a frame of superposed image as output from the image superposer and displayed on the view finder according to the third embodiment.

FIG. 15 is an illustration of a frame of image 580 as still another example to be output from the image superposer 160. The frame of image 580 includes a graph 582 displayed below a frame of image based on a post-knee picture signal, not to be superposed thereon. The graph 582 indicates a bar graph that represents luminance indices of blocks in a luminance display target block line behind a line cursor 581, at locations corresponding thereto, in their order. It is noted that the flame of image to be output from the image superposer 160 is not limited to the foregoing examples, and may be embodied in a variety of fashions.

The photographer may refer to pieces of information for exposure guide of a non-kneed picture image, as they are displayed on the view finder 170, to thereby grasp a real brilliance of a subject corresponding to an arbitrarily designative luminance display target block line, which permits an exposure setting and an image pickup to be performed as though they were in a shot by a film with a wide dynamic range. For instance, references to exposure guide information permit aperture adjustments such as those to set a luminance signal level of subject substantially to saturation, or to reduce a background luminance. Such actions enable a picture to be taken with a luminance fine-adjusted as intended by the photographer.

The output terminal 180 is adapted to input a post-knee picture signal output through the image data bus 135, for a transmission of picture signal to a device in a subsequent stage. The exposure guide is a set of pieces of information for photographer, and those to be displayed for exposure guide are excluded from the picture signal to be output from the output terminal 180. It is noted that the video image pickup apparatus 30 may have a built-in recorder for recording picture signals to be output from the output terminal 180.

Figure 16:
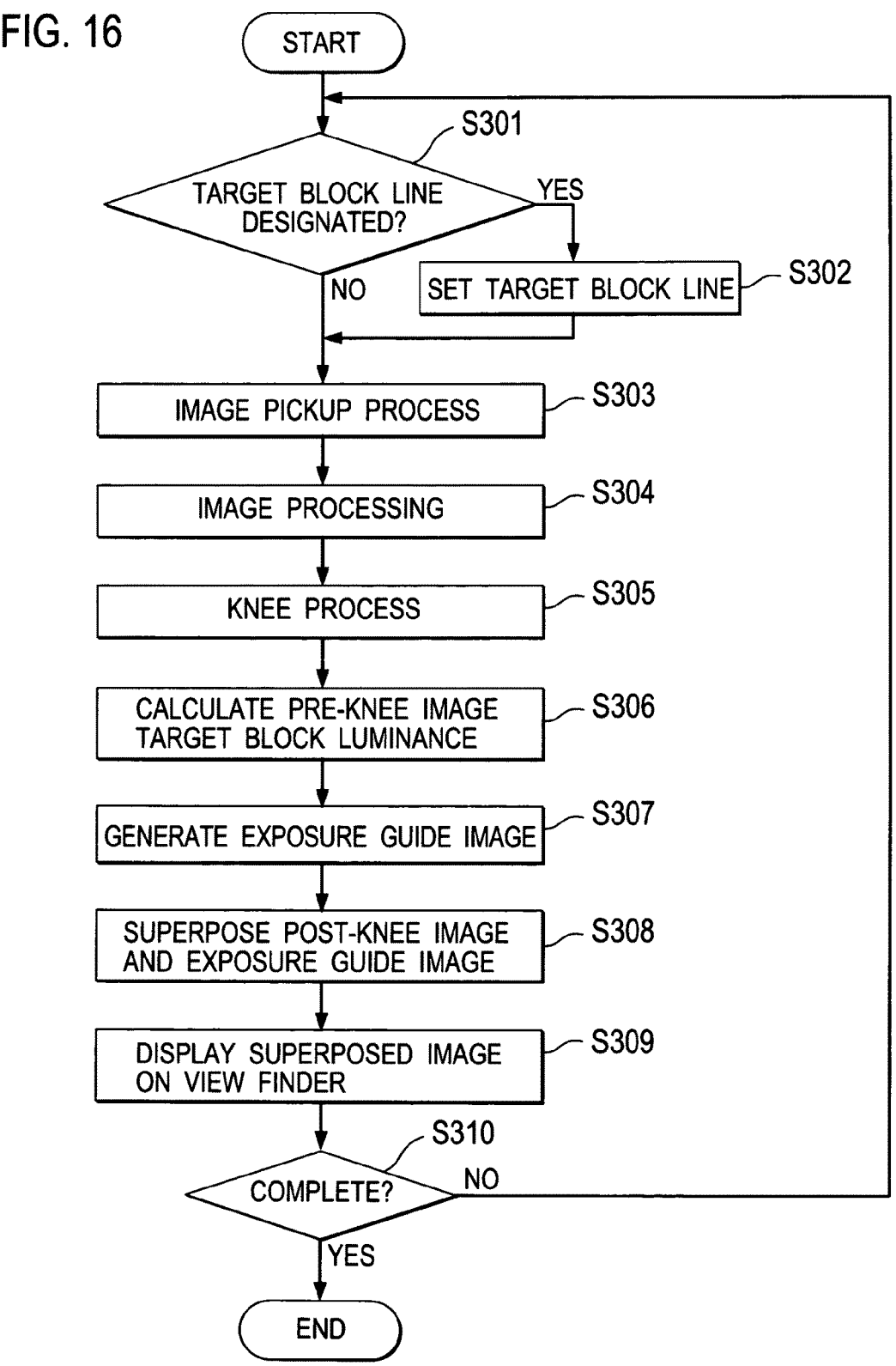
FIG. 16 is a flowchart of processes according to the third embodiment.

FIG. 16 is a flowchart of processes in the video image pickup apparatus 30 according to the third embodiment. The video image pickup apparatus 30 is adapted to accept a setting of mode, and when a mode for displaying an exposure guide indicating a luminance display target block line is set by a photographer, the following processes are performed.

If a designation of a luminance display target block line by a photographer is accepted (S301: Yes), the luminance display target block line is set in accordance with the photographer's operation (S302). It is noted that the designation of luminance display target block line can be accepted by a prescribed operation. If no designation of luminance display target block line is accepted (S301: No), a default or as-set luminance display target block line is to be taken over.

The optical system 110 and the image sensor 120 cooperatively perform an image pickup process (S303), whereby a picture signal is sent to the image processor 130. The image processor 130 performs an A/D conversion, a filtering process, a color conversion process, and the like, for an image processing to generate a picture signal, to output to the luminance display controller 350.

The image processor 130 further generates a kneed picture signal (S305), to output to the image superposer 360 and the output terminal 180. A picture signal output to the output terminal 180 is transmitted to a device in a subsequent stage.

A frame of image based on a pre-knee picture signal is sent to the luminance display controller 350, where the block luminance calculator 352 calculates a set of luminance indices of blocks in the luminance display target block line (S306). And, the display information generator 353 generates, as a set of pieces of image information to be displayed for exposure guide, a combination of a line cursor image representing the luminance display target block line and a graph representing the set of luminance indices of blocks in the luminance display target block line (S307).

The image superposer 360 superposes or combines: a frame of image based on a post-knee picture signal input through the image data bus 135; and at least a subset or subsets of a set of pieces of image information for exposure guide display input from the luminance display controller 350 (S208), on or with each other, as necessary. And, the view finder 170 displays a picture of the post-knee image frame with at least a subset or subsets of the set of pieces of image information for exposure guide display as superposed thereon or combined therewith (S309). The foregoing processes are repeated till a complete imaging (S310: Yes), thereby permitting the photographer to acquire real-time exposure guide information of an arbitrarily designative luminance display target block line.

As will be seen from the foregoing description, according to the third embodiment, the photographer is enabled to refer to an exposure guide with respect to an arbitrarily designative block line in a frame of image of non-compressed high-luminance regions displayed on a display means, to thereby grasp a real brilliance of a subject, allowing even for the video image pickup apparatus to implement an exposure setting and an image pickup as though they were in a shot by a film with a wide dynamic range.

In the first to third embodiments described, the luminance display controllers 150, 250, and 350 have their block luminance calculators 151, 252, and 352 each respectively configured to divide a frame of image based on a picture signal into a matrix of blocks as finite elemental regions of the image frame, and calculate a luminance index of each block. The luminance index of a respective block is determined from a set of luminance values of pixels in the block. The set of luminance values of pixels may be detected by a variety of applicable methods, some of which will be described below.

Figure 17A:
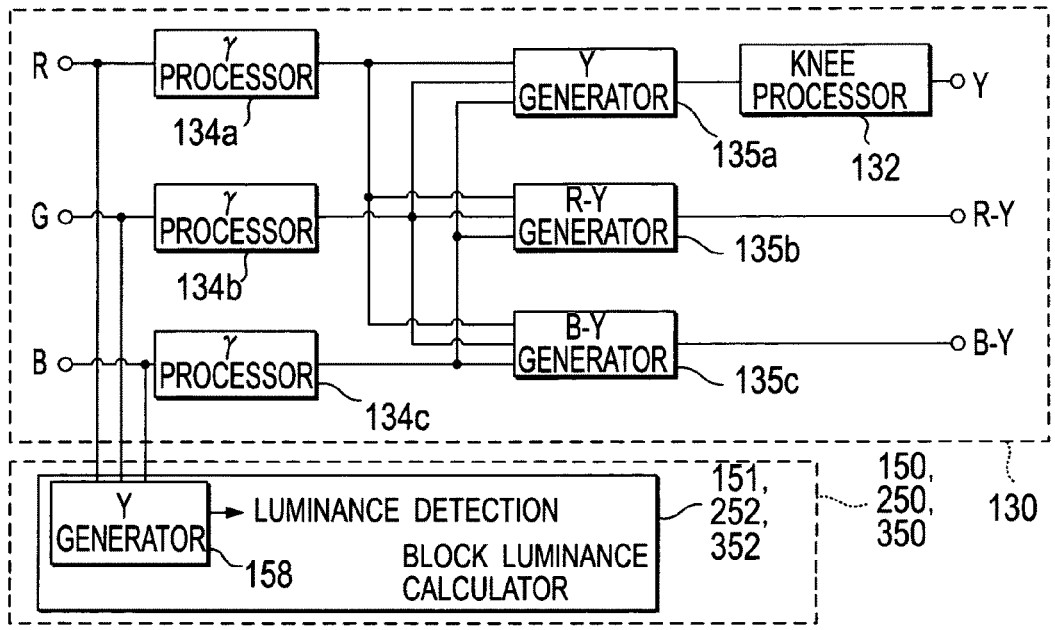
FIGS. 17A, 17B, and 17C are block diagrams of configurations for luminance detection.
Figure 17B:
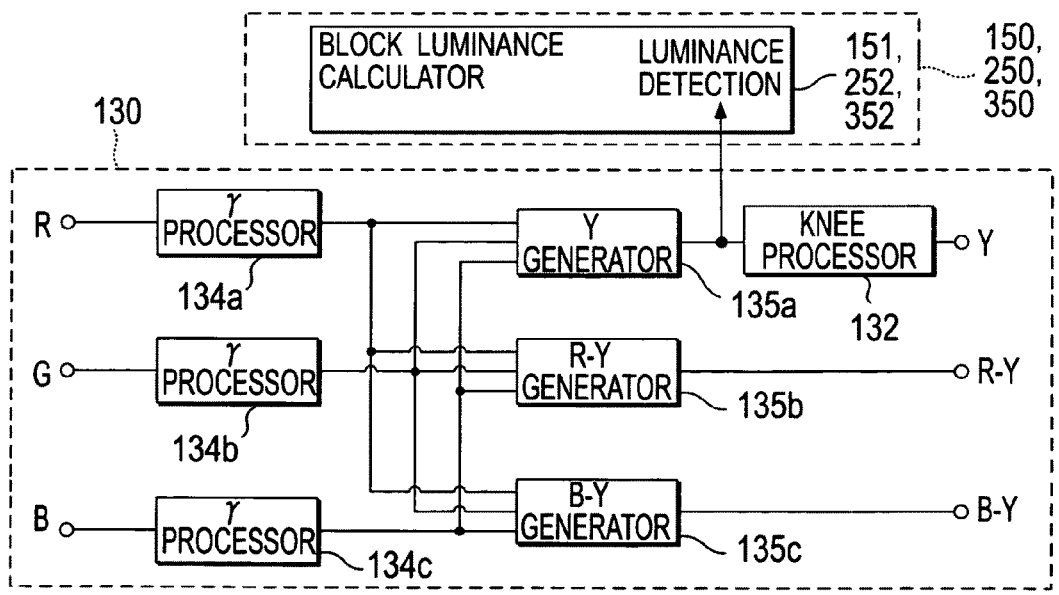
Figure 17C:
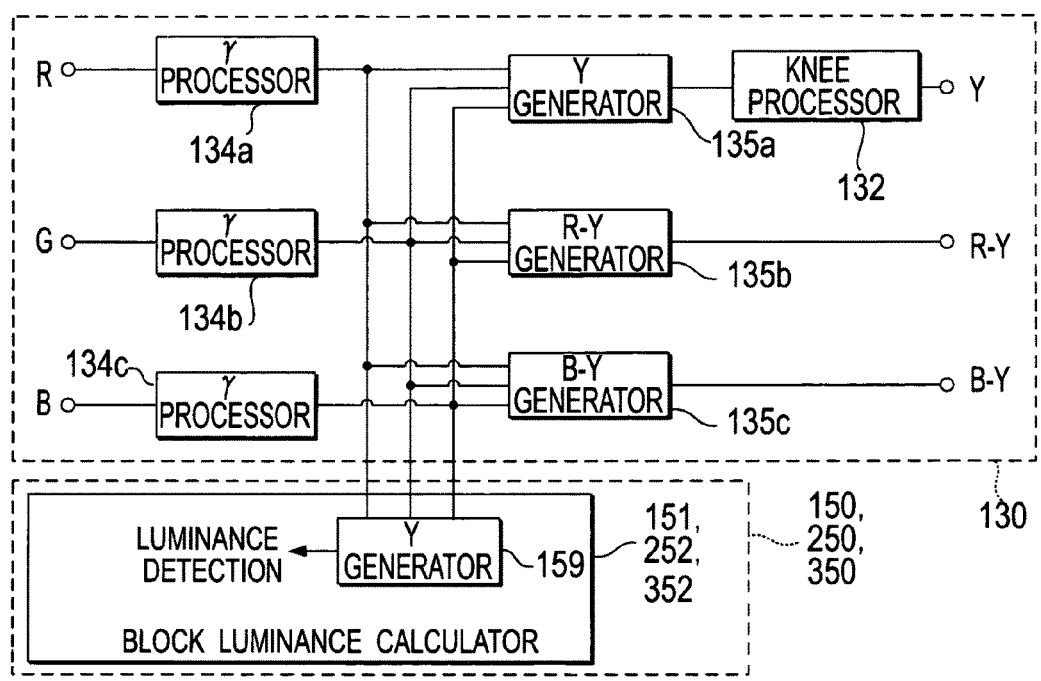

FIGS. 17A to 17C are block diagrams of first to third examples of configuration for detection of luminance values, respectively. They are each made up by associated component parts of the image processor 130 and the luminance display controller 150, 250, or 350 in the fit the second, or the third embodiment.

In each example of configuration, the image processor 130 is configured to respond to a pixel-wise set of R, G, and B color components of picture signal output from the image sensor 120, by processing it by a triple of γ (gamma) processors 134a, 134b, and 134c for γ processes of R, G, and B color components, to correct their characteristics. And, a pixel-wise set of corrected R, G, and B color components of picture signal is processed at a Y generator 135a for conversion to a Y luminance signal, at a R-Y generator 135b for conversion to a R-Y color-difference signal, and at a B-Y generator 135c for conversion to a B-Y color-difference signal. A Y luminance signal output from the Y generator 135a is knee-processed at the knee processor 132.

For the first example of configuration illustrated in FIG. 17A, a pixel-wise set of R, G, and B color components of picture signal before γ process is input to the block luminance calculator 151, 252, or 352 of the luminance display controller 150, 250, or 350, where it is processed by a Y generator 158 for conversion to a luminance signal for pixel-wise detection of luminance.

For the second example of configuration illustrated in FIG. 17B, a Y luminance signal output from a Y generator 135a of the image processor 130 is input to the block luminance calculator 151, 252, or 352 of the luminance display controller 150, 250, or 350, where it is processed for pixel-wise detection of luminance.

For the third example of configuration illustrated in FIG. 17C, a pixel-wise set of R, G, and B color components of picture signal after γ process is input to the block luminance calculator 151, 252, or 352 of the luminance display controller 150, 250, or 350, where it is processed by a Y generator 159 for conversion to a luminance signal for pixel-wise detection of luminance.

As will be seen from the foregoing description, according to the present invention, a video image pickup apparatus as well as an exposure guide display method allows for a photographer to take an image in view of a dynamic range in a situation before compression of high-luminance regions.

While preferred embodiments of the present invention have been described using specific terms, such description is for illustrative purposes, and it is to be understood that changes and variations may be made without departing from the spirit or scope of the following claims.

What is claimed is:

1. A video image pickup apparatus comprising:
   a solid-state image pickup device;
   a high-luminance compression processor configured to perform a high-luminance compression of a first picture signal based on an output signal of the solid-state image pickup device to provide a second picture signal;
   a block luminance calculator configured to divide a frame of image based on the output signal of the solid-state image pickup device into a set of blocks, and calculate a set of luminance indices of respective blocks;
   a block extractor configured to extract a first block having a highest luminance index, together with the luminance index thereof;
   a display information generator configured to generate a set of pieces of image information for exposure guide display including an image representing a region of the first block and an image representing the luminance index thereof;
   an image superposer configured to superpose a frame of image based on the second picture signal and the set of pieces of image information for exposure guide display, on each other, to generate a frame of superposed image; and
   a display configured to display the frame of superposed image.

2. The video image pickup apparatus according to claim 1, wherein
   the block extractor is configured to further extract a second block having a lowest luminance index, together with the luminance index thereof; and the set of pieces of image information for exposure guide display further includes an image representing a region of the second block and an image representing the luminance index thereof.

3. The video image pickup apparatus according to claim 1, further comprising an output interface configured for external output of the second picture signal.

4. The video image pickup apparatus according to claim 1, wherein the block luminance calculator is adapted to calculate a luminance index of a respective block as an average value or a maximal value of luminance values of pixels in the block.

5. A video image pickup apparatus comprising:
a solid-state image pickup device;
a high-luminance compression processor configured to perform a high-luminance compression of a first picture signal based on an output signal of the solid-state image pickup device to provide a second picture signal;
a block designation acceptor configured to divide a frame of image based on the output signal of the solid-state image pickup device into a set of blocks, and accept a designation of an arbitrary first block;
a block luminance calculator configured to calculate a luminance index of the first block;
a display information generator configured to generate a set of pieces of image information for exposure guide display including an image representing a region of the first block and an image representing the luminance index thereof;
an image superposer configured to superpose a frame of image based on the second picture signal and the set of pieces of image information for exposure guide display, on each other, to generate a frame of superposed image; and
a display configured to display the frame of superposed image.

6. A video image pickup apparatus comprising:
a solid-state image pickup device; a high-luminance compression processor configured to perform a high-luminance compression of a first picture signal based on an output signal of the solid-state image pickup device to provide a second picture signal;
a block line designation acceptor configured to divide a frame of image based on the output signal of the solid-state image pickup device into a set of blocks, and accept a designation of a block line composed of an arbitrary array of blocks;
a block luminance calculator configured to calculate a set of luminance indices of blocks in the block line;
a display information generator configured to generate a set of pieces of image information for exposure guide display including an image representing a region of the block line and an image representing the set of luminance indices of blocks in the block line;
an image superposer configured to superpose a frame of image based on the second picture signal and the set of pieces of image information for exposure guide display, on each other, to generate a flame of superposed image; and
a display configured to display the frame of superposed image.

7. An exposure guide display method comprising the steps of:
performing a high-luminance compression of a first picture signal based on an output signal of a solid-state image pickup device to provide a second picture signal;
dividing a frame of image based on the output signal of the solid-state image pickup device into a set of blocks, calculating a set of luminance indices of respective blocks;
extracting a first block having a highest luminance index, together with the luminance index thereof;
generating a set of pieces of image information for exposure guide display including an image representing a region of the first block and an image representing the luminance index thereof;
superposing a frame of image based on the second picture signal and the set of pieces of image information for exposure guide display, on each other, to generate a frame of superposed image; and
displaying the frame of superposed image.

8. The exposure guide display method according to claim 7, wherein
the extracting comprises further extracting a second block having a lowest luminance index, together with the luminance index thereof; and
the set of pieces of image information for exposure guide display further includes an image representing a region of the second block and an image representing the luminance index thereof.

9. The exposure guide display method according to claim 7, further comprising externally outputting the second picture signal.

10. The exposure guide display method according to claim 7, wherein
the calculating comprises calculating a luminance index of a respective block as an average value or a maxim value of luminance values of pixels in the block.

11. An exposure guide display method comprising the steps of:
performing a high-luminance compression of a first picture signal based on an output signal of a solid-state image pickup device to provide a second picture signal;
dividing a frame of image based on the output signal of the solid-state image pickup device into a set of blocks, accepting a designation of an arbitrary first block;
calculating a luminance index of the first block;
generating a set of pieces of image information for exposure guide display including an image representing a region of the first block and an image representing the luminance index thereof;
superposing a frame of image based on the second picture signal and the set of pieces of image information for exposure guide display, on each other, to generate a frame of superposed image; and
displaying the frame of superposed image.

12. An exposure guide display method comprising the steps of:
performing a high-luminance compression of a first picture signal based on an output signal of a solid-state image pickup device to provide a second picture signal;
dividing a frame of image based on the output signal of the solid-state image pickup device into a set of blocks, accepting a designation of a block line composed of an arbitrary array of blocks;
calculating a set of luminance indices of blocks in the block line;
generating a set of pieces of image information for exposure guide display including an image resenting a region of the block line and an image representing the set of luminance indices of blocks in the block line;
superposing a frame of image based on the second picture signal and the set of pieces of image information for exposure guide display, on each other, to generate a flame of superposed image; and
displaying the frame of superposed image.

* * * * *